(No Model.)

D. E. ASHBY.
PROCESS OF CANNING.

No. 363,941. Patented May 31, 1887.

Witnesses,
Geo. H. Strong.
J. H. Towne

Inventor,
D. E. Ashby.
By Dewey & Co.
Attorneys

UNITED STATES PATENT OFFICE.

DELMAR E. ASHBY, OF SAN FRANCISCO, CALIFORNIA.

PROCESS OF CANNING.

SPECIFICATION forming part of Letters Patent No. 363,941, dated May 31, 1887.

Application filed July 1, 1885. Serial No. 170,429. (No model.)

*To all whom it may concern:*

Be it known that I, DELMAR E. ASHBY, of the city and county of San Francisco, State of California, have invented an Improved Process for Canning; and I hereby declare the following to be a full, clear, and exact description of the same.

My invention relates to a process for cooking substances in jars or cans in which they are to be hermetically sealed, and it is especially applicable to the cooking of such substances in glass jars in such a manner that the glass packages will not be broken by rapid heating and cooling.

Figure 1:
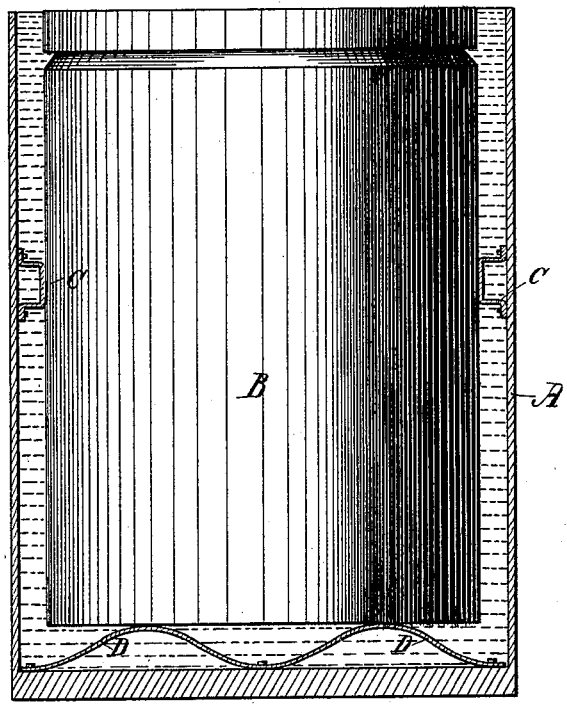
Figure 2:
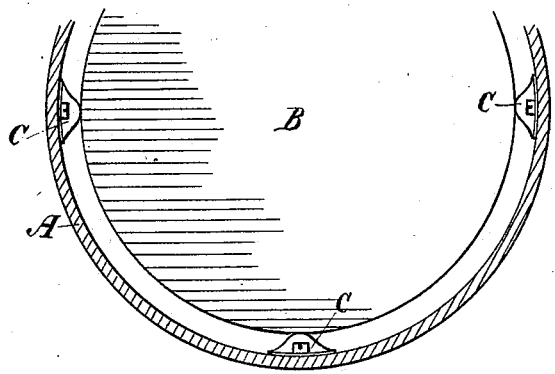

Referring to the accompanying drawings for a more complete explanation of my invention, Figure 1 is a vertical section showing a device by which I carry out my invention. The best method of cooking substances which are to be hermetically sealed in glass packages is to submerge the package in boiling water until its contents are cooked; but the difficulty to be overcome is the certainty of the glass to break at the instant when it is introduced into the boiling water, and when it is removed and exposed to the atmosphere after the cooking is completed. Fig. 2 is a plan view.

My invention is designed to provide a means for cooking substances in glass jars in such a manner that the glass will not be liable to break, either upon the commencement or completion of the operation.

It consists of a cylinder or vessel, A, which is preferably made of tin or other metal and of a size somewhat larger than the exterior diameter of the glass jar or package containing the article to be cooked. This exterior vessel has a closed bottom and sides; but the top may be left open for the introduction of the jar B. Around the sides of the vessel A may be fixed guides or projections C, and raised supports D may also be fixed to the bottom in such a manner that the glass jar will be sustained within the exterior chamber so as not to touch either the sides or the bottom, thus leaving a space for the free circulation of the water all around it. These projections may be made of hollow metal or of other simple material, and when the jar has been placed in the exterior vessel the surrounding space is filled with cold water. The whole is then introduced into a vessel of boiling water in which the cooking is to be effected, and the heat of the exterior water being conducted through the sides of the metal of the containing-vessel is gradually diffused through the body of the water surrounding the glass jar, thus raising the temperature of all parts of the glass jar equally and at once to the point at which its contents may be cooked. The jar is submerged so deeply in the boiling water that the air within it will be entirely expelled and the contents properly cooked, after which, the top being slightly raised above the surface of the water, the small hole through which the air or steam escapes may be closed by solder or otherwise, and the process will be complete. The containing-vessel A, with the jar and the water surrounding it, may then be lifted out of the boiling water and placed in a vessel of cold water, which rapidly and evenly abstracts the heat from the metal of the containing-vessel and the water within it, which surrounds a jar containing the article to be cooked, so that the jar and its contents will soon be reduced to such a temperature that it may be safely exposed to the atmosphere. It a well-known fact that when glass is inserted in boiling water it cannot be submerged so rapidly as to prevent a crack taking place, which cracks the bottom off and ruins the jar. When the cooking is completed, if removed and exposed to the air or other means for cooling, the reverse conditions thus produced will cause a crack with equal certainty.

In my invention the jar is gradually exposed to the heat by the conductive power of the metal of the containing-vessel and the thin surrounding envelope of water within it, and all danger of breakage from this cause is averted.

When the cooking is complete and the containing-vessel is removed from the water in which the cooking was carried on, it may be submerged in a body of cold water, and its temperature is equally and rapidly reduced, so that the jar can be taken from it and exposed to the atmosphere without danger of breakage.

Having thus descibed my invention, what I claim as new, and desire to secure by Letters Patent, is—

A process for cooking in glass and preserving the glass from breakage, consisting in submerging the glass vessel in an exterior receptacle containing cold water, plunging this vessel into a tank of boiling water until the contents of the interior vessel are cooked, then removing the vessel, with its contained jar still surrounded by water, and allowing the whole to cool together, substantially as described.

In witness whereof I have hereunto set my hand.

DELMAR E. ASHBY.

Witnesses:
S. H. NOURSE,
H. C. LEE.